(12) United States Patent
Vela et al.

(10) Patent No.: US 10,880,763 B1
(45) Date of Patent: Dec. 29, 2020

(54) REMOTE ANTENNA COVERAGE CHANGE EVENT DETECTION IN MOBILE WIRELESS NETWORKS

(71) Applicant: United States Cellular Corporation, Chicago, IL (US)

(72) Inventors: Mario Vela, Knoxville, TN (US); David Brent Amos, Knoxville, TN (US); Michael Reed Hobson, Roanoke, VA (US); Kenneth Wotring, Aurora, WV (US); Zachary Wozich, Casco, ME (US); Michael S. Irizarry, Barrington Hills, IL (US); Narothum Saxena, Hoffman Estates, IL (US)

(73) Assignee: United States Cellular Corporation, Chicago, IL (US)

( * ) Notice: Subject to any disclaimer, the term of this patent is extended or adjusted under 35 U.S.C. 154(b) by 0 days.

(21) Appl. No.: 16/797,950

(22) Filed: Feb. 21, 2020

(51) Int. Cl.
| | |
|---|---|
| *H04W 40/00* | (2009.01) |
| *H04W 24/04* | (2009.01) |
| *H04W 16/24* | (2009.01) |
| *H04W 88/08* | (2009.01) |
| *H04W 84/04* | (2009.01) |
| *H04M 1/725* | (2006.01) |
| *H04W 88/02* | (2009.01) |

(52) U.S. Cl.
CPC ........... *H04W 24/04* (2013.01); *H04W 16/24* (2013.01); *H04M 1/72519* (2013.01); *H04M 1/72522* (2013.01); *H04W 84/045* (2013.01); *H04W 88/02* (2013.01); *H04W 88/08* (2013.01)

(58) Field of Classification Search
CPC ... H04W 24/04; H04W 16/24; H04W 84/045; H04W 88/08; H04W 88/02; H04M 1/72519; H04M 1/72522
USPC ..................................... 455/446, 500.1, 418
See application file for complete search history.

(56) References Cited

U.S. PATENT DOCUMENTS

| | | | | |
|---|---|---|---|---|
| 10,548,032 | B2 * | 1/2020 | Ouyang | ................... H04L 43/04 |
| 2013/0236007 | A1 * | 9/2013 | Munro | .............. H04W 12/0401 380/44 |
| 2015/0036477 | A1 * | 2/2015 | Wang | ................... H04L 41/0672 370/216 |
| 2016/0356635 | A1 * | 12/2016 | Usami | ...................... H04Q 9/00 |
| 2017/0156657 | A1 * | 6/2017 | Flax | ...................... A61B 5/1118 |
| 2017/0179595 | A1 * | 6/2017 | Ogawa | ................... H01Q 1/246 |

(Continued)

*Primary Examiner* — Danh C Le
(74) *Attorney, Agent, or Firm* — Leydig, Voit & Mayer, Ltd.

(57) ABSTRACT

A computer-automated maintaining a physical configuration of an antenna operating within radio access network (RAN) of a mobile wireless network is described. A feature subset of a covering set of features for the antenna is specified. A centroid is generated for the antenna, wherein the centroid comprises a current long-term values of the feature subset obtained by processing multiple data sets for the feature subset over a relatively long time period. An antenna change detection decision is rendered, wherein the rendering an antenna change detection decision comprises first applying a current short-term values of the feature subset, which are representative of a current status of the antenna, to the centroid to render a current distance from centroid. In accordance with detecting an antenna change event during the applying, an antenna change event notification is issued that corresponds to the detected antenna change event.

22 Claims, 5 Drawing Sheets

(56) References Cited

U.S. PATENT DOCUMENTS

| | | | |
|---|---|---|---|
| 2017/0236061 A1* | 8/2017 | Laborie | G06F 9/45558 |
| | | | 706/46 |
| 2017/0245127 A1* | 8/2017 | Pedersen | H04W 4/18 |
| 2019/0239101 A1* | 8/2019 | Ouyang | H04L 43/0823 |
| 2019/0373521 A1* | 12/2019 | Crawford | H04L 67/10 |
| 2020/0028795 A1* | 1/2020 | Tiwary | G06Q 10/06313 |
| 2020/0076709 A1* | 3/2020 | Stenberg | H04W 24/02 |

* cited by examiner

| | |
|---|---|
| 301 | Antenna Identification (cell ID/sector ID) |
| 302 | Ground truth (Boolean) – true/false positive |
| 303 | Status variables (feature and non-feature descriptor values) |
| 304 | Centroid feature value set |
| 305 | Current feature data value set |
| 306 | Centroid-Current Feature Distance |
| 307 | Remedial Action code |

FIG. 3

| Calculated Daily - Grid/Cell first then Daily Cell Only | | |
|---|---|---|
| Feature/Metric Name | Grid/Cell Calculation | Daily Cell Only Calculation |
| Grid Count | 1 | Count of grids meeting filter criteria |
| Record Count | Sum of Records per grid/cell id | Average of Grid/Cell Results for this metric |
| Average RSRP | Average RSRP per grid/cell | Average of Grid/Cell Results for this metric |
| Average RSRQ | Average RSRQ per grid/cell | Average of Grid/Cell Results for this metric |
| Average CQI | Average CQI per grid/cell | Average of Grid/Cell Results for this metric |
| Average Download Throughput | Average Download Throughput per grid/cell | Average of Grid/Cell Results for this metric |
| Average Distance | Calculate the distance of each record from the cell location. Average all distance calculations per grid/cell id | Average of Grid/Cell Results for this metric |
| Azimuth Delta | Calculate the azimuth (angle of each record from the cell location, adjust ). Calculate the difference between the configured azimuth, and the measured azimuth. Adjust to value in range of -180 to 180 degrees. (Negative values indicate measured value is to left of configured when facing configured azimuth from cell site) Average all individual azimuth deltas per grid/cell id. | |
| Daily Cell Only Calculation | | |
| Total RRC Connection Attempts | N/A | Calculate the Daily Sum of metric per Cell ID |
| Total Inter-frequency Handoff Success | N/A | Calculate the Daily Sum of metric per Cell ID |

FIG. 4

REMOTE ANTENNA COVERAGE CHANGE EVENT DETECTION IN MOBILE WIRELESS NETWORKS

FIELD OF THE INVENTION

This invention relates generally to the field of mobile wireless communications networks. More particularly, the invention is directed to maintaining the radio access network interface for mobile wireless networks, and more specifically to maintaining radio access network infrastructure components supporting the air access links for communications carried out over mobile wireless networks.

BACKGROUND OF THE INVENTION

Radio access networks (RAN) constitute an essential link in all mobile wireless communications networks. Moreover, RAN components such as antennas and associated signal transmitting/receiving electronics hardware are subject to change without necessarily failing catastrophically. Such changes, in contrast to catastrophic failures of RAN components, are less likely to be detected by live monitoring by a RAN maintenance technician merely observing real-time mobile wireless network feature (e.g., performance parameter) data.

Taking, for example, changes in physical antenna positioning, operations personnel may intentionally modify Antenna tilts and azimuths in cell towers to manage particular cell coverage and traffic patterns in a RAN. Intentional changes to physical positioning and/or orientation of antennas may be handled through normal operational and maintenance procedures, and the engineers generally know the resulting operational impact of the intentional adjustments to the particular RAN components. However, unintended changes in antenna configurations as a result of weather events, structural aging and fatigue, or any other of a variety of causes may alter performance (e.g. coverage area) of RAN components in ways, or to a degree, that are not readily discernible by RAN operations monitoring and maintenance personnel. Such unintended/undetected changes may degrade overall performance of RAN cell arrays generally and coverage patterns of individual cell sites particularly.

Undetected/unintentional changes to RAN components present a significant problem for RAN service providers since degraded cellular service performance arising from involuntary unknown antenna changes can negatively impact users' experience and overall satisfaction with the services provided by their mobile wireless communications network services provider. However, the massive quantities of RAN network cells/antennas and the potential changes that may result in degraded RAN service, preclude human observation and/or monitoring performance of RAN components to identify and remedy involuntary antenna changes in a timely manner.

Maintaining an optimized RAN configuration is needed now more than ever due to the high level of demand for high quality RAN connections supporting high data rates to support a wide range of mobile wireless device applications with high data rate requirements. One way to ensure optimization of RAN antennas is to physically inspect the antennas and take direct measurements in the field. However, this direct/manual approach to maintaining optimal physical antenna orientation/coverage is highly impractical in large networks. However, no automated system has demonstrated an ability to reliably detect, and initiate appropriate remedial actions with regard to, unintended changes in RAN components resulting in changes to individual antenna/cell coverage specifically and RAN performance generally.

SUMMARY OF THE INVENTION

Embodiments of the invention are used to provide a method, non-transitory computer readable medium, and a computer system configuration facilitating and performing operations for acquisition and processing of data point sets for a configured set of RAN interface features, on an individually identified antenna/cell basis to facilitate identifying and correcting unintended changes to RAN component configurations (e.g. antenna physical positioning) resulting in coverage area changes. However, merely acquiring massive data point sets on an individually identified antenna/cell basis alone is insufficient to identify changes since changes to particular RAN interface features may arise from changes to usage patterns that have nothing to do with the coverage of an identified antenna/cell of a RAN. In such cases, a "false-positive" may lead to unnecessary/undesirable modifications to an antenna/cell configuration.

In view of the above concerns, a method, non-transitory computer readable medium, and computer system configuration are described for maintaining a physical configuration of an antenna operating within radio access network (RAN) of a mobile wireless network. The system implements the method including specifying a feature subset of a covering set of features for the antenna. The method further includes generating, by a centroid calculator, a centroid for the antenna, wherein the centroid comprises a current long-term values of the feature subset obtained by processing multiple data sets for the feature subset over a relatively long time period. The method further includes rendering an antenna change detection decision, wherein the rendering an antenna change detection decision comprises first applying, by an antenna coverage anomaly detection component, a current short-term values of the feature subset, which are representative of a current status of the antenna, to the centroid to render a current distance from centroid. The method includes issuing, by the antenna anomaly detection component in accordance with detecting an antenna change event during the applying, an antenna change event notification corresponding to the detected antenna change event.

BRIEF DESCRIPTION OF THE DRAWINGS

While the appended claims set forth the aspects of the present invention with particularity, the invention and its advantages are best understood from the following detailed description taken in conjunction with the accompanying drawings, of which:

FIG. 3 is an exemplary event record, including a set of descriptive data elements associated with an antenna change event for a particularly identified antenna;

FIG. 4 is an exemplary set of feature types acquired, stored, processed and analyzed for a particular time period and mobile wireless data network element in exemplary systems to calculate a multi-dimensional centroid and a multi-variable distance therefrom in accordance will an illustrative system for detecting operationally significant antenna physical coverage area change events;

DETAILED DESCRIPTION OF THE DRAWINGS

Figure 1:
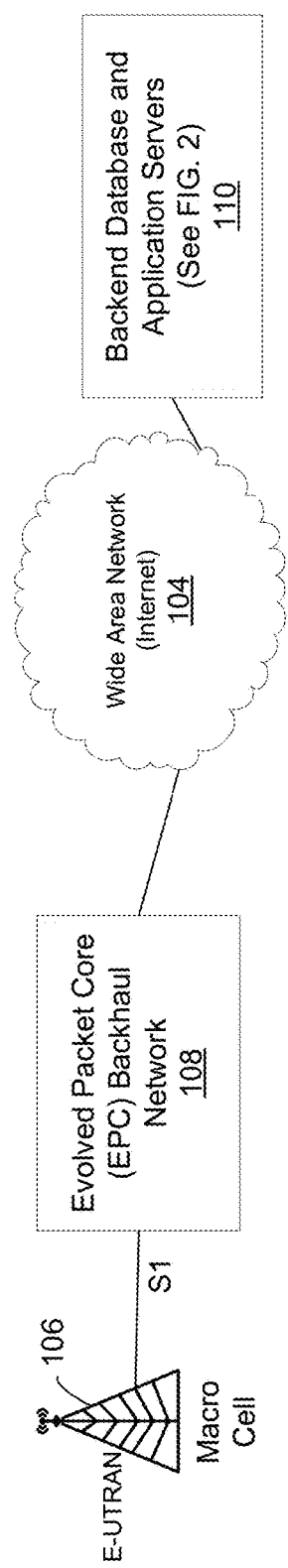
FIG. 1 is a schematic diagram illustrating a mobile wireless network environment interfaced to a broadband digital data network providing access to a variety of application servers.

Exemplary embodiments of the invention described herein acquire and process a combination of mobile wireless data network performance parameter (feature) data point sets to render, from a centralized remote monitoring and administration center, performance information that is subsequently evaluated to identify changes to RAN component configurations requiring remedial maintenance/repair operations.

The system and method described herein identify a change to a coverage area associated with a cell tower in a RAN cell array. Such changes in coverage may occur, for example, as a result of a change to a RAN component configuration, such as tilt and/or azimuth position of an antenna on a cell tower. Such identification of cell/sector coverage changes and remedial actions to be taken to enhance coverage of a particular antenna within the RAN cell array may be carried out in an automated manner.

The described exemplary system configures (via training performed on an individual cell/sector basis) and then applies a multidimensional distance-from-centroid-based anomaly detection operation to a set of feature data points to detect a physical antenna change resulting in a modified coverage area. By way of example, the antenna coverage change is identified by establishing a multi-parameter centroid on each sector of a plurality of cells. The centroid is generated based upon measurements for multiple parameters obtained over an extended period of time (at least several days). Thereafter, a "distance-from-centroid" metric value is generated for each sector of each cell from parameter values accumulated on a short-term basis such as, for example, on a daily basis.

During a training operation that occurs prior to bringing the antenna detection logic online, the set of features that make up the centroid are determined, where the set of features comprise a subset selected from a covering feature set based upon a training period that involves acquiring performance data points for each one of the covering parameter set over several days for a particular cell/sector of interest. After the training operation, the multi-dimensional distance-from-centroid metric values are generated with reference to the specifically configured set of features for the multi-dimensional centroid. The covering feature set includes a variety of parameters (generally referred to herein as "features") whose values are derived from a combination of operating support system (OSS) data and geo-spatial metrics.

In an illustrative example, during configuration of the features making up the multi-dimensional centroid for a particular cell/sector, a statistical analysis is performed on a large quantity of data points acquired over an extended time period for each of the covering feature set to identify a feature sub-set that reliably indicates an antenna change affecting coverage area. In a particular example, the statistical analysis is an optimization technique that minimizes overlap between two kernel densities curves of the pre-antenna change event distances and post-event distances applied to a training data set of known antenna changes. Simply put, the optimization technique selects features (e.g., performance parameters) to minimize the instances of both false positive (detecting an exceeded threshold for raising an alarm when no significant physical change to an antenna has occurred) and false negatives (failing to detect a significant physical change to an antenna).

The determined subset of features, in illustrative examples, is not static. Instead, as more information is obtained during operation of both a particular antenna and a population of all (including similarly situated) antennas, the aforementioned statistical analysis is repeated to update the subset of features and/or the weighted contribution of each feature to the distance-from-centroid determination. In such case, the statistical analysis may be based on an augmented data set including both: (1) updated data point sets, and (2) actual instances of detected/undetected/falsely detected antenna change events.

The remote antenna coverage change detection operation may be performed, on an individual antenna basis, at any time after the initial configuration (or subsequent re-configuration—removing and/or adding features) of the multi-dimensional centroid definition. The antenna change detection operation includes establishing a multi-dimensional centroid "location" for the particular antenna (e.g. combination of cell/sector IDs). The location of the centroid is defined by a long-term time-filtered/averaged set of values corresponding to each one of the subset of features for the antenna of interest. The antenna change detection operation further includes establishing a set of current values for each one of the subset of features. Thereafter, a distance metric value is generated that is based upon the individually determined distances between current values (calculated on a short-term basis) of the subset of features and long-term values for the subset of features specified by the centroid. The distance metric value represents a current performance of a particular individual antenna.

Thus, a physical antenna change resulting in a significant change to an antenna coverage is detected by applying current values of the subset of features to the long-term values of the same subset of features of the multi-dimensional centroid. In accordance with illustrative examples, a physical antenna change alarm event is raised in response to determining that a calculated multi-dimensional difference (e.g. multi-dimensional distance metric) between a current (relatively short-term) multi-dimensional feature sub-set and a long-term multi-dimensional centroid (calculated on the same configured feature subset on, for example, a weekly basis), exceeds a detection threshold.

The system described herein includes built-in safeguards to ensure reliable detection of antenna change events that require remedial actions to be taken to address a true antenna change event. For example, to avoid a "false positive" in response to anomalous feature data sets arising from temporary/unordinary conditions), an antenna coverage is not deemed to have changed until the detection threshold is met a designated number of consecutive times (over a period of time that is still less than the long-term centroid calculation time frame). Moreover, the designated number of consecutive times can be increased/decreased in an inverse relationship to either (or both): a time duration of the data acquisition, and a number of data set samples acquired in a measurement period (e.g. daily) since the likelihood of encountering an anomalous data set decreases as the time span and/or the number of data set samples increases.

Thus, given the need to compare a long term average (centroid) and short term (daily monitoring) to detect a physical antenna change, in the illustrative examples provided herein, the system incorporates a multi-component remote antenna change detection system to acquire and analyze, in accordance with a training-based configuration, feature data sets. The analysis of the acquired data sets includes two distinct operations.

First, the detection operation multi-dimensional feature data point analysis includes calculating, by a batch process, a reference multi-dimensional centroid. The reference multi-dimensional centroid may be calculated (updated) relatively infrequently, such as on a weekly basis, to conserve computing resources and ensure relatively stable data point set calculation results—in the absence of a change to an antenna's physical positioning resulting in a change to the antenna's coverage area. Moreover, a time period for acquiring data set values for calculating the centroid may be chosen according to data seasonality. Thus, data points are acquired and grouped based upon distinctly identified seasons in a repeating set of seasons, where each season is characterized by differences in usage patterns of a cell site's antenna(s). Such "seasonality" may apply to any of a wide variety of time periods of distinct usage patterns, and thus may be based upon portions of a day, days of a week, identified holidays, special events, etc. Thus, for example, seasonality of usage patterns within a single day and days within a week is addressed by re-calculating the reference multi-dimensional centroid on a weekly basis in the illustrative example. Additional implementations may address seasonality by assigning particular time periods within a day or days within a week, to particular data set bins to account for seasonality. The "binning" approach may be used when it is impractical to extend the time period for acquiring data point sets for calculating the centroid that cannot be accounted for by extending the duration of the time for acquiring the data point sets for re-calculating the reference multi-dimensional centroid.

Second, the system uses the multi-dimensional centroid to calculate a signal/connection distance metric calculated on a daily basis using current short-term values for the subset of features for determining, based upon the calculated distance metric, whether a change has occurred to coverage by a particular antenna.

The system is, by way of example, deployed using a combination of database/client machines running statistical programming languages such as, for example, R (open source programming language) and BUSINESS INTELLIGENCE software like IBM COGNOS or Jaspersoft's JASPERSERVER.

The identification of an antenna coverage area change and subsequent remedial action is based upon, and relates specifically to, RAN coverage data.

Turning to FIG. 1, an exemplary network environment is schematically depicted that includes monitoring and management components facilitating acquiring and processing a variety of feature data in accordance with mobile wireless data network feature detection functionality. The schematic diagram depicts physical/structural components of an illustrative embodiment of the invention carried out in an exemplary (e.g., LTE or Long Term Evolution) mobile wireless data network environment. The environment depicted in FIG. 1 is substantially simplified, as one skilled in the art would readily observe. In an implementation, thousands of cell towers (base stations), such as a macrocell 106 comprising one or more antennas acquire and aggregate millions of feature value sets. The macrocell 106 is, for example, a Long Term Evolution (LTE) EnodeB Macro Cell.

The macrocell 106, by way of example, includes radio bearer resources and other transmission equipment necessary for wireless communication of information. The macrocell 106 includes one or more transceiver-antenna combinations. In the case of sectorized macrocells, two or more antennas are provided to cover particular parts of an area (actually a volume of space, discrete coding scheme, or sinusoidal phase offset) covered by the macrocell 106. A typical arrangement for a cellular communications macrocell is a tri-sector arrangement where three static areas are arranged in carefully engineered "n" degrees of rotational displacement from one another. Macrocells (and cells in general), come in a variety of forms, and there is no intention to limit the scope of the disclosed examples to any particular arrangement. More generally, there is no intention to limit the disclosure to the exemplary environment schematically depicted in FIG. 1 since the described management system and scheme for detecting problematic antenna changes, applies to other types of wireless communications systems.

The scaling of base stations within the network continues to grow as smaller base station solutions continue to emerge through wireless innovation. (i.e., picocells, femtocells, hotspot solutions, etc). Each of the base stations is capable of acquiring thousands, even millions, of data points during a period of observation used to develop a model/criterion for a properly operating antenna interface for a cell of interest.

The feature value sets are forwarded by the macrocell 106 via an S1 interface (in the illustrative example) to an evolved packet core (EPC) backhaul network 108 (in the illustrative LTE mobile wireless communications network environment). The EPC backhaul network 108, in turn, provides the acquired/forwarded feature value sets via a wide area network (Internet) 104 to a backend databases and application servers 110. By way of a particular example, the feature/performance data sources include: (1) eNodeB sources providing directly captured OSI Layer 2 (Data Link) and Layer 3 (Network) data; and (2) Operating Support System (OSS) Operations and Management related performance metrics. The backend databases and application servers 110 are described in detail herein below with reference to FIG. 2.

The illustrative mobile wireless data network infrastructure/environment depicted in FIG. 1 is not intended to limit the invention with regard to alternative network topologies. Rather, it is intended to provide a visualization of a network architecture suitable for incorporating the described remote antenna change detection technology described herein. Other examples include a wireless access network complying with one or more of CDMA2000, WCDMA, UMTS, GSM, GPRS, EDGE, Wi-Fi (i.e., IEEE 802.11x), Wi-MAX (i.e., IEEE 802.16), or similar telecommunication standards configured to deliver voice and data services to mobile wireless end user devices.

Moreover, the source of feature data is not limited to data directly acquired by the RAN interface nodes (e.g. macrocell 106). For example, the feature data may also be acquired and accumulated/stored on mobile wireless devices. In such case, the application program interfaces (APIs) on the mobile device capture feature data from network devices and network functions (NFV) in 5G networks. As such, it is envisioned that a substantial portion of the feature data volume will be initially acquired by the APIs running on users' mobile wireless devices and then forwarded via uploading of accumulated data files to backend databases and application servers 110.

Figure 2:
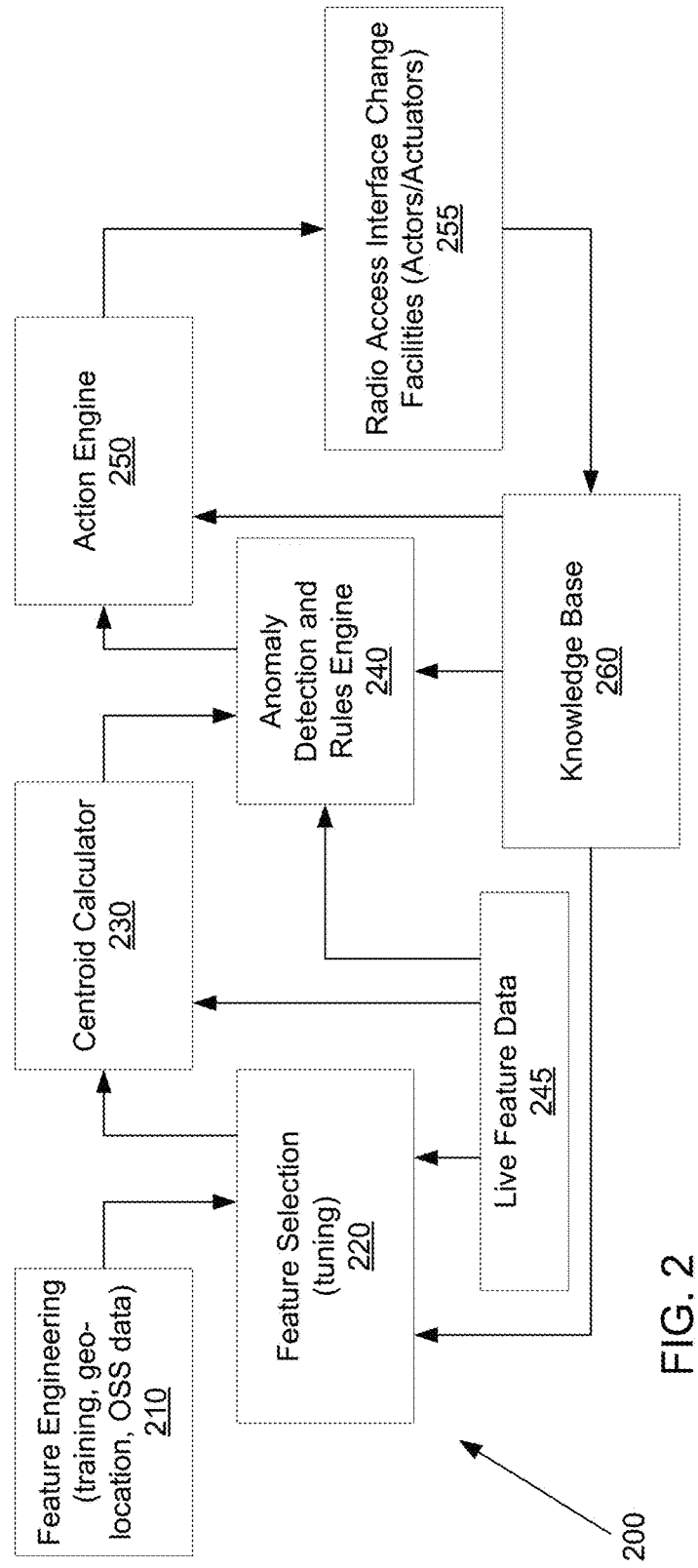
FIG. 2 is a schematic functional block diagram identifying exemplary components of backend database and application servers that carry out a supervisory monitoring and remedial action initiation control for radio access network interface components by identifying an antenna physical change resulting in a change in coverage area in accordance with an illustrative example.

As those of ordinary skill in the art will appreciate, the foregoing network elements of the mobile wireless system of FIG. 1, including particular elements of the backend database and application servers 110, described herein below with reference to FIG. 2, are implemented via telecommunications equipment having one or more computer processors, as well as non-transitory computer readable media, such as RAM/ROM, solid-state memory, and/or hard drive memory and the like, which store computer executable instructions for executing embodiments of the methods described in further detail below.

Turning to FIG. 2, a functional block diagram identifies primary components of a system 200 for identifying an antenna that has experienced a changed coverage area, which may indicate an unintended physical re-orientation of the antenna or other antenna repair/maintenance by appropriate technicians. The identified functional components of a system 200 identified in FIG. 2 support the antenna coverage change detection operations of the antenna coverage change detection system described herein. Such change detection system is carried out on the backend database and application servers 110 (depicted in FIG. 1) comprising programmed processing hardware for carrying out the functionality of components of the system 200 described herein below. By way of example, feature data points (e.g. RAN Layer 2 and Layer 3 feature data) corresponding to the information types summarized in FIG. 3 (described herein below) are received by the EPC backhaul network 108 from mobile devices and macrocells, and forwarded by the EPC backhaul network 108 via the WAN 104 to the backend database and application servers 110. An exemplary data format for received data points include a timestamp (time period, such as a date and hour within which the data was acquired), a network element ID (identifying an antenna associated with the data point), a data type identifier, and a data point value.

A feature engineering component 210 comprises a configuration user interface that facilitates designating a set of geo-spatial metric parameters to be used to generate a set of data point sets to be acquired and processed by the system 200 in accordance with the antenna coverage change operations described herein. Sources of information for the feature engineering component 210 include: Operating Support System (OSS) data, training data sets, and geolocation data. The feature engineering component 210, based upon potentially millions of OSS and training data points, generates the aforementioned covering set of features. The feature engineering component 210 is responsible for the implementation of the potentially custom aggregations and logic that might be needed for designating particular ones of the candidate feature types to be used in the system 200. An exemplary implementation of the feature engineering component 210 implements the aggregations of features summarized/listed in FIG. 4 (described herein below).

The system 200 further includes a feature selection component 220 that includes processes that facilitate selecting, from the covering set of features established by the feature engineering module 210, a subset of features (also referred to herein as "features") for data point sets. The parameter/feature set selection may be for a particular given physical antenna instance or for a set of physical antenna instances in a particular physical/operational environment. The selected combination of features (and potentially weights assigned to each) ensures accurate detection of antenna coverage changes requiring remedial action by antenna technical support personnel. The feature selection component 220 facilitates tuning a list of parameter value types for data point sets that are used to calculate a centroid and distances for an antenna. By way of example, the feature selection component 220 utilizes a training/test data point sets and may be carried out offline by the system 200 to identify a particular sub-set of the covering set of features to be used at a particular antenna installation or a group of similarly situated antennas. Decision making by the feature selection component 220 is informed, in an illustrative example, by both: (1) a live feature data 245 containing feature (performance parameter) value data sets associated with past and current operation of identified antennas, and (2) historical information regarding past detected antenna change events (including full supporting data) maintained by a knowledge base 260.

A centroid calculator component 230 determines a multi-dimensional (performance parameter/feature) centroid for a particular identified antenna (e.g. cell/sector ID combination) based upon the live feature data 245 provided by a macrocell associated with the particular identified antenna. The centroid is determined according to a configuration (e.g. designated repetition period and input antenna metric parameters) established via the feature engineering component 210 and refined/tuned by the feature selection tuning component 220. The centroid provides a multi-variable numerical "location" for calculating distances for multi-variable a set of data point sets corresponding to mobile wireless device connection instances supported by the antenna during a selected period (e.g. 24 hours). The centroid calculator component 230 generates a relatively long-term set of values for the subset of features (performance parameters) specified by the feature selection component 220. During the centroid calculating, the centroid calculator component 230, by way of example, carries out additional data cleansing and normalization operations that: (1) filter outlier data points, (3) establish a scale/scoring criterion for particular performance parameters/features and (2) establish a distance-from-centroid threshold corresponding to identification of an antenna change event.

In the illustrative example herein, each identified antenna (corresponding to a particular cell/sector ID combination) is characterized, for example, by a combination of: azimuth, tilt and frequency band configuration. In accordance with illustrative examples provided herein, based upon a determined distance between the centroid and current values of a subset of features for an identified antenna, one of more of the antenna characterization parameters (e.g. azimuth, tilt, and frequency bands) are changed in a remedial action taken in response to a detected antenna change event for the identified antenna when the calculated distance-from-centroid exceeds the established distance-from-centroid threshold established by the feature selection component 220.

The system 200 also includes an antenna coverage anomaly detection component 240. The antenna coverage anomaly detection component 240 executes the aforementioned distance calculation operations on the data point sets (provided by the live feature data 245) and the current centroid (provided by the centroid calculator 230) for a particular antenna. The antenna coverage anomaly detection component 240 enforces an anomaly detection process that includes at least the following: (1) calculating a distance (potentially averaged over multiple short-term data samples) of a current multi-feature value set from a corresponding reference centroid, for a specified cell/sector ID, when a new set of data arrives into the system for the specified antenna, (2) comparing the calculated distance with a distance threshold for antenna physical change detection, (3) applying, optionally/additionally, additional rules to reject false positive event detection (e.g. require multiple repeated detections of the event thereby providing some hysteresis to ensure that a detected antenna change event was a result of a permanent change and not merely a transient change), and (4) reporting the detected antenna change event to an administrative and/or alarm system (e.g. an action engine component 250).

In an illustrative example, the antenna coverage anomaly detection component 240 incorporates artificial intelligence (e.g. pattern matching using a neural network or other machine learning component) to detect and/or identify an antenna change event. By way of example, such artificial intelligence-based determination is based upon: (1) individual distances of the current values for the subset of features from the centroid, and (2) a composite distance of the current values for the subset of features from the centroid. The antenna coverage anomaly detection component 240 provides, by way of example, the individual distances and the composite distance to the neural network to render a decision including: (1) antenna change detection decision (true/false), (2) a level of certainty regarding the detection decision, and (3) a list of potential antenna change types corresponding to the detected change event and corresponding levels of certainty regarding each of listed potential antenna change types. Thus, in the above described illustrative example, decision making by the antenna coverage anomaly detection component 240 is enhanced by analyzing a pattern of distances by individual ones of the current (short-term) values of the subset of features (features) from corresponding values of the centroid for a particular antenna.

Additionally, in illustrative examples, decision-making by the antenna coverage anomaly detection component 240 is further informed/based upon historical antenna change event records maintained by the knowledge base component 260 (see FIG. 3). The operation of the antenna coverage anomaly detection component 240 is described/discussed further herein below.

The action engine component 250 receives a notification, from the antenna coverage anomaly detection component 240, of the antenna change event. In response to the notification, the action engine component 250 identifies one or more specific remedial actions to be performed on the particular antenna corresponding to the detected antenna change event. Decision making by the action engine component 250 is informed by current information regarding the actual detected event provided by the antenna coverage anomaly detection component 240 and historical information provided by the knowledge base component 260. The action engine component 250 issues a notification/command message regarding the one or more specific remedial actions to a radio access interface change facilities 255. By way of example, the facilities 255 comprise any of a variety of message destinations including: maintenance personnel (email, text message, etc.) and automated control equipment (e.g. electro-mechanical actuators).

Examples of specific actions include, but are not limited to:

1. Adjusting an antenna tilt angle (to remedy a coverage change arising from an involuntary change to the original configured tilt angle);

2. Adjusting antenna azimuth errors (similar to antenna tilt angle);

3. Notifying a network operations center (NOC) of an anomalous antenna configuration (e.g. issue a pre-configured email or SMS message including an identified antenna and indication of potential mobile wireless service disruption and/or degradation);

4. Notify specific network operations personnel in case additional physical actions are needed (e.g. issue a pre-configured email or SMS message including an identified antenna change and recommendation for remedial action);

5. Notifying specific mobile wireless service providers in charge of maintenance activities on behalf of the communications service provider (CSP); and 6. Triggering specific CRM actions to subscribers in the affected areas including notifications, changes in their plan policies, and/or network parameter changes to compensate for the impacted changed in coverage conditions.

The knowledge base component 260, mentioned previously hereinabove, operates as a historian. In that role, the knowledge base component 260 receives and retains a historical record of detected antenna change events (both actual and false alarm events)—including the detected current and centroid feature sub-set values that resulted in the change event alarm condition. The knowledge base component 260 also records a remedial action (or combination of actions) taken as well as the resulting change (if any) to the operation/coverage area of the affected antenna. As such, the stored contents of the knowledge base component 260 provide the basis for operation of an automated machine learning-based rules engine of the action engine component 250 that utilizes the stored data patterns of the knowledge base component 260 to render, using pattern recognition analysis, proposed remedial actions for alarm events exhibiting similar feature (change) patterns resulting in a calculated distance from the centroid exceeding a prescribed threshold (over a prescribed hysteresis period). The knowledge base component 260 is thus both a historian and a prescriptive element within the entire solution that complements the action engine component 250 and enables an automatic, artificial intelligence/neural network-based remedial action determination when a distance-based alarm event arises for a particular antenna instance.

In a particular illustrative example, the knowledge base 260 stores a set of event records associated with antenna change events for particularly identified antennas. Each of the event records includes, by way of example (as shown in FIG. 3): an antenna identification 301 (cell/sector ID combination) for the particular antenna; a ground truth 302 comprising a Boolean variable specifying whether the event was true/false (i.e. whether or not an actual change had occurred); a status variable set 303 including the feature (performance parameter) values and external (non-feature) variable values, a centroid parameter value set 304, a current feature value set 305, a calculated distance 306, and a remedial action code 307 for an action taken (if any) with respect to the detected antenna change event. Such information may be rendered from a variety of external sources including: customer notifications (confirming that an antenna change occurred), completed work order tickets (confirming a remedial action taken in response to a particular confirmed antenna change event), and self-optimizing network (SON) automated change records. Moreover, the external (non-feature) values of the status variable set 303 may also include a miscellaneous notes that may include a description of special circumstances (e.g. a scheduled event that caused a sudden and significant change in the number of mobile devices within the operating area of an antenna) that causes a sudden and significant change in feature data set values.

With continued reference to FIG. 2, each of the above mentioned components of the system 200 will be further described herein with reference to detailed examples. The feature engineering component 210 includes a geographic grid/cell aggregation methodology/interface that includes, for an identified antenna, a grid (divided into a set of individual grid elements) overlaying a geographic area of interest. The total geographical area of a particular grid for an identified antenna (cell ID) may be any size. However, the total grid area for a particular identified antenna should be at least 1 square kilometer. Moreover, the total geographic coverage of the grid is not necessarily a 1 km×1 km square as other shapes, such as rectangles and triangles, are contemplated for a particular cell/antenna grid.

In the illustrative example, a feature data point set containing event records having a latitude/longitude assignment, on a per event record basis, are geographically coded and assigned to particular location elements (e.g. geographical boxes) of the grid/cell antenna aggregation construct. The aggregated data point sets are maintained with location (grid element position within grid) and antenna identifiers. Subsequent processing of the data point sets (including quantity/frequency-based filtering on each grid element for each antenna grid) is performed by the other components of the system 200 with reference to groups of data point sets identified by particular grid element/antenna identification combinations over a specified time period of aggregation.

Turning to FIG. 4, an exemplary covering set of features are provided that support the antenna coverage change detection operations of the system 200 described herein. The figure contains a first column that identifies, by name, a potential feature type (Feature/Metric) that is maintained for carrying out the computations described herein below to calculate a centroid and a set of distances from the centroid for a particular identified antenna of a RAN. A second column identifies a type of calculation performed on the identified data type on an identified antenna and grid combination basis. After completion of the aggregations identified in the second column, the results are ranked by group and sorted by the record count for each antenna identification in descending order. The ranked results are then filtered to only include results ranked number one. A third column identifies a calculation performed on a daily basis for the filtered results from aggregation of the second column data on the identified data type.

A grid count 332 maintains a value corresponding to a count of all grid element/cell antenna identifier combination constructs containing data point sets that meet a current filtering criterion. For example, a data filtering criterion (keep/discard) for a particular identified grid element position and period of time is to keep a data point set that corresponds to a cell/antenna that is identified in the greatest number of data records (also referred to herein as "data sets") for the particular grid element position and period of time. The data records associated with cells/antennas that had fewer records for the period of interest are disregarded for the particular acquisition period of interest (though the records may be kept in the event that other acquisition periods may be used for other calculations). Thus, for a particular geospatial grid element position served by multiple cells/antennas, the cell/antenna identified as having the most records for the particular grid during the acquisition period is used for performing centroid and current feature distance calculations.

Thus, in an illustrative example, during data record (data set) pre-processing/filtering, an initial aggregating of all data records is performed for a particular geographical grid element/position over a specified time period. Thereafter, a filtering operation is performed on the records of all cells/antennas accumulated for the particular grid element over the specified time period. Thereafter, the quantities of feature data bearing records are counted for each represented cell/antenna for the particular geographical grid element/position for the time period to determine the cell/antenna having the most records for the specified grid element and time period. The data records associated with the antenna having the most saved records during the time period for the particular element are kept for further processing (of the centroid and current distance therefrom). This filtering operation is carried out for all grid elements/positions of interest within the geographical grid. Upon completion of the (data record/set quantity-based) filtering operation, for any given grid element/position within the geographical grid, all remaining feature data records will correspond to a single identified cell/antenna—the cell/antenna associated with the greatest quantity of acquired data records/sets during the period of interest for the grid element.

After the above-described filtering of data records so that records of only a single antenna are present at each geographic grid element position for a time period of interest, the resulting data sets are used to calculate a current centroid and distance therefrom for purposes of indirectly identifying a potential antenna change events with respect to particular antennas.

The above-described filtering stage (resulting in data records of a single antenna for each grid element) uses a criteria to evaluate each grid in the initial aggregation and only retains the results record for the identified cell/antenna corresponding to the most data records containing the feature data of interest for a period (e.g. a day) of interest. The illustrative example leverages load type metrics (e.g., record count and/or byte volume metrics) to facilitate identification of antenna change events. Application of a "greatest record count" filter on geographically grouped data records is one example of a useful data filter. Additionally, in the rare instance where two antenna/cells tie for the largest record count, a byte volume metric for the cell/antenna for the grid position during the period of interest serves as a potential tie-breaker criterion. Alternatively, in the case of a tie, the tying sets of data records are all kept.

In an illustrative example, the above highest records count selection, filtering is augmented by a further requirement that the number of data records for a particular antenna and grid element must meet/exceed a specified threshold. Such minimum record requirement potentially operates to reduce a noise in the data set. By way of example, the threshold is a configurable value (e.g., 100 records per cell/grid element/day). In a particular example, the threshold is a configurable value that is determined through the use of a machine learning component of the system.

While two grid element (granularity) level filtering examples are described above (i.e., highest count cell/antenna and threshold based), other data point filtering criteria are contemplated.

A record count 334 maintains a count of all data point sets/records processed for each identified cell antenna (for each grid element). The record count 334 for each identified grid/cell combination is used to calculate a daily average for record counts by grid element/cell antenna identifier combination.

An average RSRP 336 maintains an average RSRP for each grid/cell antenna identifier combination. The average RSRP 336 is calculated for each identified grid/cell antenna combination on a daily basis.

An average RSRQ 338 maintains an average RSRQ for each grid/cell identifier combination. The average RSRQ 338 is calculated on a daily basis.

An average CQI 340 maintains an average CQI for each grid/cell antenna identifier combination. The average CQI 340 is calculated on a daily basis.

An average download throughput 342 maintains an average download throughput for each grid/cell antenna identifier combination. The average download throughput 342 is calculated on a daily basis.

An average distance 344 maintains an average distance of each record from the cell site (antenna) origin latitude/longitude. Each record uses, by way of example, the haversine equation to calculate the distance of a mobile wireless device from the antenna for the particular cellular call/data session instance. The average distance 344 is calculated on a daily basis by: (1) averaging the per session instance record distance for each grid/cell antenna identifier combination, and (2) calculating the daily average distance specified in cellular data/call session records at the cell antenna identifier level.

An average azimuth delta 346 maintains an average difference between configured azimuth and calculated azimuth of all records having a same identified grid/cell antenna identifier combination. The average azimuth delta 346 is calculated on a daily basis by: (1) calculating the individual record azimuth using the cell antenna identifier, latitude/longitude, and the recorded latitude/longitude to determine the azimuth. The formula for calculating azimuth is also known as Bearing Formula. The traditional formula related to Haversine math, or a Rhumb Line Bearing formula may be used since the records have very close geographical context. Finally, the delta must be calculated and set to a value between −180 and 180 relative to the configured azimuth with negative values reflecting the delta to the "left" of the configured azimuth and positive values reflecting the delta to the "right" of the configured azimuth as determined from the cell antenna location. The per record delta calculation is then averaged to the grid/cell antenna identification level, and (2) the daily grid/cell antenna average delta calculations are then calculated after initially performing filtering to the daily/grid element/cell antenna level of granularity.

Additionally, two metrics are calculated daily for an identified cell antenna and are not subject to the above-describe (highest per grid element) rank-based filtering. A total RRC connection attempts 350 contains a count of all RRC connection attempts performed on a particular antenna (identified by cell ID) across all grid elements (i.e. without regard to grid element position). A total inter-frequency handoff successes 352 contains a count of all successful handoffs performed by the identified cell antenna on a daily basis across all grid elements (i.e. without regard to grid element position).

With continued reference to FIG. 2, the centroid calculator 230 processes input data point sets identified by a particular cell antenna/grid combination to render a centroid on a recurring (e.g. weekly) basis as well as supporting/related calculations associated with identifying RAN antenna/cell coverage changes. In the illustrative example, the centroid calculator 230 employs a two-step operation for calculating a centroid on a multi-dimensional (e.g., parameter/feature) data point set. The centroid calculator 230 also provides an updated detection threshold for a particular identified cell antenna and grid combination (in cases where multiple geographical grid arrays are maintained (e.g. ones having different grid element sizes) for a same identified cell antenna).

The centroid calculator 230 also generates/maintains a set of standardization parameters (e.g., mean and standard deviation) for each dimension of the multi-dimensional data points used in calculating a centroid for each distinct cell antenna ID and grid combination (in cases where multiple grids are defined for a same cell antenna ID. In accordance with illustrative examples provided herein, the standardization feature values are applied to future acquired data points to scale the data points and maintain a consistent standardization process. By way of example, in a particular illustrative implementation, each feature value $g_i$ is standardized/normalized according to following the formula:

$$\hat{g}_i = \frac{g_i - \mu_{PRE}}{\sigma_{PRE}}$$

Where
$g_i = \{m_1, m_2, m_3, \ldots, m_H\}$
$\mu_{PRE} = \{\mu_1, \mu_2, \mu_3, \ldots, \mu_H\}$
$\sigma_{PRE} = \{\sigma_1, \sigma_2, \sigma_3, \ldots, \sigma_H\}$
Thus, Where $\mu_{PRE}$ and $\sigma_{PRE}$ are the corresponding mean and standard deviation values for each of the dimensions calculated before (the standardization parameters), the following is a specific numerical example:
Given a point:
$g_i = \{1, 2, 3, 4\}$
$\mu_{PRE} = \{0.5, 0.6, 0.7, 0.8\}$
$\sigma_{PRE} = \{2, 3, 4, 5\}$
The corresponding standardized values of $g_i$ are:
$\{(1-0.5)/2 (2-0.6)/3 (3-0.7)/4 (4-0.8)/5\}$
$\hat{g} = \{0.25, 0.46, 0.57, 0.64\}$ With continued reference to operation of the centroid calculator 230, a first centroid calculator stage of the centroid calculator 230 provides a centroid from a raw input multi-dimensional feature (performance parameter) data point set for a cell antenna ID and grid combination. The centroid is therafter used to calculate a distance from the centroid for each data point from the data point set by a second centroid calculator stage. In particular, such distance calculations are made as the second centroid calculator stage filters "K" largest distances (e.g. K equals 1) from the initially determined centroid (by the first stage), and each of the data points having the K largest distances from the centroid are removed from the raw input multi-dimensional data point set. The remaining ones of the input multi-dimensional data point set are used to calculate a current centroid for the identified cell/grid combination. The current centroid is stored for use by other components (described herein below) that identify changes to a coverage area of an identified cell. The filtering process carried out by the second centroid calculator stage may be used to remove potential distance outliers that may negatively impact the accuracy of the subsequently executed processes (i.e. reduce the incidences of false positives).

Additionally, further data point filtering may be performed by using an anomalous data point distance detection threshold. By way of example, a distance threshold is taken as the largest distance of the filtered set multiplied by an expansion factor (T) that enables the control of the sensitivity of the cell coverage change detection operations. In an illustrative example, T has a value of 2, which results in removing any point having a distance from the centroid that is twice the largest distance of a data point from the previously processed/filtered data point set.

The process of determining a centroid by the centroid calculator 220 is described below. First, an initial set (X) consisting of N multi-dimensional data points is acquired for processing by the first centroid calculator stage (i.e., X={$x_1$, $x_2$, $x_3$, . . . , $x_N$} where each $x_i$ is a properly standardized (e.g. mean, standard deviation, etc.) multidimensional data point of M dimensions (i.e. where $x_i$={$m_{i1}$, $m_{i2}$, $m_{i3}$, . . . $m_{iM}$}.

The multi-dimensional centroid (C) of the multi-dimensional data point set X (containing N data points) is the multi-dimensional point C, where C={$c_1$, $c_2$, $c_3$, . . . , $c_M$}, and where $$c_i = \frac{1}{N}\sum_{j=1}^{N} m_{ji},$$

where i=1, 2, . . . , M.

After calculating the multi-dimensional (M dimensions in the current example) centroid C, a distance is calculated between each one of the N multi-dimensional data points and the centroid C, where a distance $d_i$ from any multi-dimensional data point $x_i$ to the centroid C is determined according to the equation:

$$d_i = \left[\sum_{j=1}^{M}(x_{ij}-c_j)^2\right]^{\frac{1}{2}} \text{ for } i=1,2,\ldots,N$$

After computing the multi-dimensional distances of the multi-dimensional data points of the data point set X from the multi-dimensional centroid C, the system next identifies outliers based upon the computed point-to-centroid distances. Let the set P={$p_1$, $p_2$, $p_3$, . . . , $p_N$} be the ordered list of data point distances, where the data point distances are ordered according to the multi-dimensional distances of the N data points {$d_1$, $d_2$, $d_3$, . . . , $d_N$}, where $p_1 < p_2 < p_3 < \ldots < p_N$.

By way of simple example, a data point outlier prevention operation removes "K" multi-dimensional data points of the sorted set P (containing N data points) having the largest multi-dimensional distance from the centroid C (trimming). The value of K may be any appropriate count value where K is at least 1 (K=0 representing no trimming). In practice, the number is adjusted to accommodate both the quantity of data points (N) and the level of aggressiveness of the filtering. By way of a further example, the value of K is an integer based upon removing a fraction of the set of data points in the initial set X of data points. Other ways for determining a quantity K of data points removed from the initial set X of data points are contemplated.

After removing the "K" multi-dimensional data points, resulting in a distance-filtered set X' containing N–K data points, a new centroid C' is calculated using the N–K remaining data points according to the above-described multi-dimensional centroid calculating operation. The new centroid C' necessitates calculating a new set of ordered distances Q={$q_1$, $q_2$, $q_3$, . . . , $q_{N-K}$} where $q_1 < q_2 < q_3 < \ldots < q_{N-K}$.

A detection threshold for a particular cell ID and grid combination is determined by: (1) a highest filtered distance value (i.e. the value of the distance of the element $q_{N-K}$ in the set Q defined above, and (2) an expansion factor T. In the illustrative example the detection threshold=$q_{N-K}*(1+T)$.

Thus, in the illustrative example, the centroid calculator component 230 performs the function of centroid determination for a particular identified cell ID/grid. This function includes the sub-functions of determining a filtered set of multi-dimensional data points and calculating a detection threshold for the cell ID/grid based upon an initial set X of multi-dimensional data points for the cell ID/grid.

The feature selection component 220 is described, with reference to an illustrative example, herein below. The feature selection component 220 processes input training sets of particular for multi-dimensional data point sets for specified grid dimensions, parameters (features), and known antenna changes. By way of example, the data point sets represent parameter values accumulated during a 4 week window containing a known configuration change to a particular antenna (e.g. two weeks before and two weeks after the change) that results in a coverage area change for the particular antenna. Other periods are contemplated for the data point set window. The feature selection module uses the data points acquired during the specified window to identify and select a best combination of grid dimensions and parameter (feature) types to ensure proper identification of antenna changes for which remediation is needed to address a corresponding antenna coverage change (minimize the classification error).

The feature selection component 220, by way of example, runs in an offline operating environment. As such, the feature selection component 220 is employed to carry out an initial parameter (feature) type selection, and subsequently to investigate additional parameter types on an ongoing basis as additional types of parameter data become available.

In the illustrative example, the feature selection component 220 comprises two serially executed stages. A correlation analysis stage and a feature set optimization stage. The correlation analysis (redundant parameter identification) stage identifies, for potential removal, one of any two strongly correlated parameters. Since maintaining and processing data points for multiple correlated parameters, when a single one of such parameters would suffice, could impact the efficiency and/or performance of the antenna change detection operation and increase the search time for the best combination in the next stage without adding to detectability of antenna change events. The operation of the correlation analysis stage (including eliminating redundant/correlated parameters) results in a list of non-correlating parameters (features).

A feature set optimization stage continues the process of determining (providing) an optimized set of parameters (features) for which multi-dimensional data point values will be gathered. The optimized set of parameters is a subset of the list of non-correlating parameters determined (provided) by the correlation analysis stage. The feature set optimization stage iteratively processes the test set of data points for each unique combination of parameters from the list of non-correlating parameters. For each combination, centroid-to-data point distances are calculated and grouped for purposes comparing centroid-to-data point distances on a pre/post antenna-change event basis. The pre/post event data is further grouped on a daily basis. Thus, resulting in 14 pre-event and 14 post-event daily point set calculations for a particular combination of non-correlating parameters under consideration. Thus, a total of 28 daily point set values are determined for each particular combination of non-correlating parameters.

The pre-event and post-event multi-dimensional data point-to-centroid distance calculation groups provide the input data for creating pre-event/post-event pairs of kernel density curves—one pair of curves for each unique combination of feature values. A kernel density curve overlap is determined for each of the kernel density curve (pre/post change) pair. The pre-event/post-event kernel density curves and the curve overlap are determined for each unique combination of the list of non-correlating parameters. Thus, for three non-correlating features, a total of seven density curve sets (and corresponding overlap) are determined for each cell ID (assuming only one grid is defined for each cell ID). In particular, for a set of three features {a,b,c} there will be a pair of pre/post density kernel for the following combinations of features: a, b, c, ab, bc, ac, and abc. Thus, a total of 7 kernel analyses are performed per each CellID.

After performing the above-described iterative calculations for each unique non-correlating parameter combination for each cell ID (antenna) in a RAN area of interest, the feature set optimization stage determines an average kernel density curve overlap amount among all the Cell IDs represented in the training data set for each non-correlating parameter combination. The average kernel density curve overlap amount is reported as a single scoring metric (for later ranking of non-correlating parameter combinations). The feature set optimization stage is described further herein below.

Since the aim of the automated system described herein is to ensure that antenna changes leading to changes in coverage area are accurately detected (with the intention of reducing/eliminating false positive and false negative determinations), the combination of non-correlating parameters that results in the lowest average overlap value between pre-event and post-event curves is selected as a feature combination set during runtime monitoring of the RAN from which the test data point set was obtained.

In a particular illustrative example of the above analysis, a combination of two features was determined to provide a desired raising of a triggering event (i.e. the distance from centroid determination accurately/reliably coincided with a real antenna physical change event). The two features are, in the particular example, "average distance" and "average azimuth delta" features. However, it is emphasized that, in view of the many different operating environments within which antennas are installed, the best combination of features for detecting antenna physical changes will not always be this particular feature combination.

A detailed description of the feature set optimization stage, of the feature selection component 220, is provided herein below. The raw set of training data includes 28 days of data point sets containing the data values for the previously identified list of non-correlating parameters. In the illustrative example, the training raw data set includes multi-dimensional data points for 14 days before the date of an antenna change event and 14 days after the date of the antenna change event (e.g. the tilt angle of the antenna changed by a specified number of degrees). Data point sets on the date of the antenna change event are not used given that the data points on that date would have to be separated between pre- and post-event data point sets, and would therefore have fewer samples to evaluate than the other dates in the set. The pre- and post-event data point sets are identified as follows:

14 days of Pre-event data points $X_{PRE}=\{e_1, e_2, e_3, \ldots, e_{14}\}$ 14 days of Post-event data points $X_{POS}=\{g_1, g_2, g_3, \ldots g_{14}\}$ For each iteration of the above-summarized process, each multi-dimensional point "$e_i$" and "$g_i$" has one or more dimensions selected from one of the possible combinations from the list (set) of non-correlating parameters determined during the correlation analysis stage. As noted above, each possible combination of parameters from the list non-correlating parameters are processed during each iteration to establish a best combination of parameters for detecting an antenna change (i.e. result in the least overlap between pre- and post-event data point value kernel density plots.

A detailed description/example is provided for the process carried out during each of the multiple process iterations within the feature set optimization stage (i.e. for each distinct combination of the list of non-correlating parameters). Initially, a reference centroid for the particular parameter combination is generated by invoking/applying the centroid calculator 220 to the 14 days of pre-event data points ($X_{PRE}$). During each iteration, the centroid calculator 220, in addition to the centroid for the particular parameter combination, returns standardization/statistical measures (e.g. mean, standard deviation) for each of the parameters.

With regard to processing post-event data point sets, during calculation of distances for the post-event data points, the standardization parameters rendered by the centroid calculator 230 for a particular iteration (parameter combination) are applied to the post-event data when calculating centroid-to-data point value distances.

Continuing with the illustrative iterated operation example, each multi-dimensional data point $g_i$ of the set of post-event multi-dimensional data points may be standardized according to the following formula:

$$\hat{g}_i = \frac{g_i - \mu_{PRE}}{\sigma_{PRE}}$$

Where H is the number of features of a particular combination for a particular iteration, $g_i = \{m_1, m_2, m_3, \ldots, m_H\}$
$\mu_{PRE} = \{\mu_1, \mu_2, \mu_3, \ldots, \mu_H\}$, and
$\sigma_{PRE} = \{\sigma_1, \sigma_2, \sigma_3, \ldots, \sigma_H\}$ are vectors for the H non-correlating parameters selected for the particular iteration. The statistical values "$\mu_{PRE}$" and "$\sigma_{PRE}$" are the mean and standard deviation values, respectively, for each of the particular ones of the selected parameters, and these values are used to standardize the pre-event data.

Next, during the iteration for a particular selected combination of non-correlating parameters, the distances are calculated as follows:

Where the centroid of the data set $X_{PRE}$ is the multi-dimensional point C, where H is the number of selected dimensions/parameters for the particular iteration and $C = \{c_1, c_2, c_3, \ldots, c_H\}$,
$i = 1, 2, \ldots, N$, and
$l_j$ is a factor in either $e_i$ or $g_i$ depending on whether the data point is a pre-event or a post-event data point,
the distance $d_i$ from any point from $X_{PRE}$ and $X_{POS}$ to the centroid C is given by $$d_i = \left[\sum_{j=1}^{H} (l_j - c_j)^2\right]^{\frac{1}{2}}.$$

After carrying the above-described calculations for a single iteration, there are 2 sets of centroid-to-data point distances—the pre-event distances and the post-event distances.

Next, the amount of overlap between pre- and post-event distances are compared. In the illustrative example, the two sets of distances are used to create an estimated Gaussian Kernel Density curve for distances. The amount of overlap of the pre- and post-distance calculation density curves is recorded for purposes of determining the pair of pre-post-event data point distances having the least amount of overlap—indicating a combination of non-correlating parameters most likely to provide a detectable indication of an antenna change event.

Upon completion of the full set of iterations, covering each unique combination of non-correlating parameters for a particular antenna change event, the antenna change event, the combination of parameters providing the lowest degree of overlap, and the overlap of pre- and post-event density curves are reported/recorded for the particular cell ID and grid (in the event that multiple alternative grid areas are used.

Figure 5:
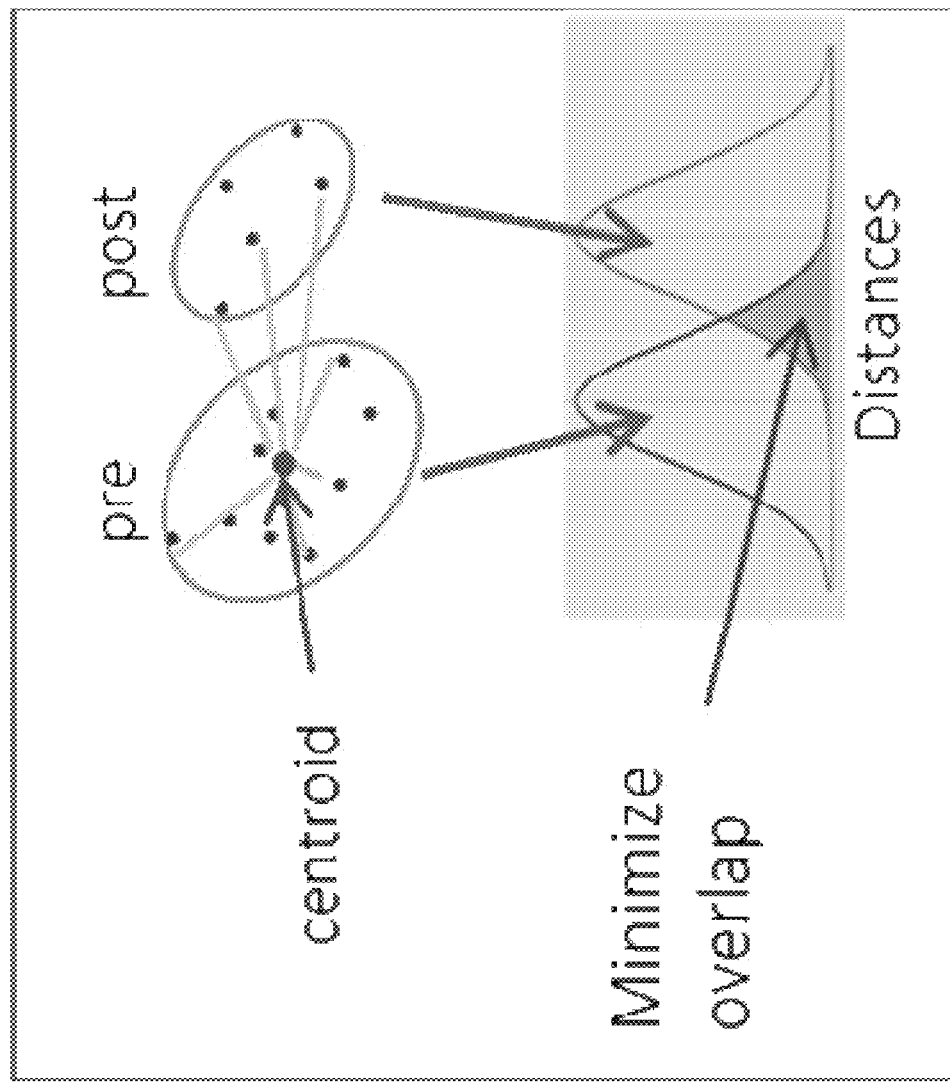
FIG. 5 is an exemplary set of calculated distance from centroid data point values associated with an antenna change pre-event and post-event time periods.

Turning to FIG. 5, an exemplary set of 2-dimensional point plots (and centroid C) is provided to show an analytical approach to identifying a sub-set of features that are selected to facilitate identifying an antenna change event. In the illustrative example, the post-event data points are significantly farther from the centroid C—leading to a shifted post-event kernel density curve in FIG. 5 that results in a low degree of overlap between pre-event and post-event distance-from-centroid values. The overlap area is the area of potential false positive and/or undetected change depending upon how the system handles such calculated values. One approach may be to wait until the value in the overlapping area repeats a sufficient number of times and/or changes to fall within the non-overlapping value range.

In a particular illustrative example, the above-summarized process for a single iteration, for a particular antenna change event, Cell ID and non-correlating parameter combination, is repeated for each Cell ID in a test/training set of Cell IDs in a system to establish an average density curve overlap for the particular non-correlating parameter combination across all Cell IDs in the system.

The above-described multiple iterations (one for each Cell ID in the system of interest) are repeated for each unique non-correlating parameter combination to render an average (across all Cell IDs) for each non-correlating parameter combination. Thereafter, in a case where a single optimized non-correlating parameter combination is to be chosen across all cell IDs in a system, the combination with the lowest average overlap (across all cell IDs in a system) is chosen as the optimized combination of non-correlating parameters for a particular antenna change event.

In the above-provided example, a single non-correlating parameter combination is chosen across all cell IDs. However, in other embodiments, combinations are selected on a particular cell-ID basis. In that case, there is no need to calculate an average density curve overlap across multiple cell IDs of a system.

The optimized set of non-correlating parameters, determined by the feature selection component 220, is thereafter used by the antenna coverage anomaly detection component 240 and the centroid calculator 230. The operation of the antenna coverage anomaly detection component 240 is described, by way of a detailed description of an illustrative example, herein below.

For example, once the feature set has been optimized, the antenna coverage anomaly detection component 240 (assuming only a single grid is associated with each cell ID) accesses the following three pieces of information for each cell ID: (1) a reference centroid, (2) a set of standardization parameters (e.g., a mean and standardization value for each one of the set of non-correlating parameter identified as the optimized set) for each cell ID, and (3) a detection threshold.

Based upon the above-identified three types of provided data, the antenna coverage anomaly detection component 240 determines whether a new multi-dimensional data point (acquired on a daily/cell-ID basis) constitutes an anomalous data point (indicative of an antenna coverage change) by performing the following operations. First, the anomaly detection component 240 standardizes the new data point using standardization parameters (e.g. mean, standard deviation) that were previously calculated by the centroid calculator 230 (described above). Second, the anomaly detection component 240 calculates a multi-dimension data point-to-centroid distance. Thereafter, the anomaly detection component 240 compares the calculated distance with a distance threshold. If the distance exceeds the threshold (plus any additional hysteresis) the daily distance is classified as anomalous (i.e. indicative of a change to the antenna's coverage). In an illustrative example, an additional set of rules may be put in place to minimize false positives. In particular, the anomaly detection component 240 maintains a FIFO storage of at least the last "D" anomaly detection decisions. The anomaly detection component 240 issues an alarm message after determining that the last "D" decisions have all indicated that an anomaly has occurred. Alternatively, the decision to issue an alarm may be based upon a combination of multiple factors including, for example: (1) a degree to which a current reading deviates from an acceptable value/level, and (2) a number/percentage of readings in the FIFO indicate that an anomaly has occurred exceeds a threshold. The selection of the value for "D" may be adjusted as desired for particular environments/situations.

Figure 6:
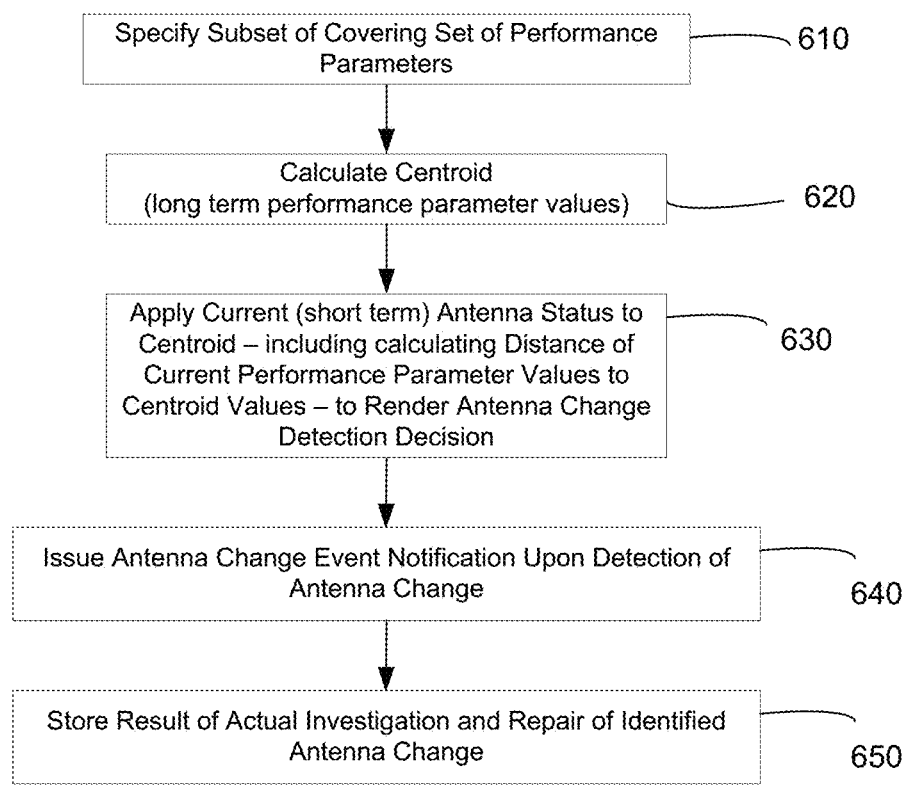
FIG. 6 is a flowchart summarizing a set of steps for carrying out a method of generating notifications in response to remotely sensed antenna change events, associated with changes to mobile wireless RAN components, through evaluation of particular feature values

Turning to FIG. 6, a flowchart provides a summary of a set of operations performed by an antenna coverage change detection system for rendering, on an individual RAN antenna basis, a computer-generated antenna coverage area change notification based upon a distance metric calculated by comparing short-term feature (performance parameter) values, for example daily user connection location data sets, for a particular RAN antenna to the relatively long-term corresponding feature values of a centroid for the particular RAN antenna. The detailed operations (performed by the components identified in FIG. 2) are incorporated by reference and will not be repeated herein below.

During 610 a subset of a covering set of features are specified by the feature selection component 220.

During 620, the centroid calculator 230 generates a centroid comprising a relatively long-term feature set obtained by processing multiple data sets for the features over a relatively long time period (e.g., filtering data sets using a relatively long time constant, averaging multiple sets of data points for the features acquired over a long time period, etc.). Additionally, by way of a particular example, during 620 the centroid calculator also provides standardization parameters and detection thresholds. However, the standardization parameters and detection threshold information, which is used to determine whether a change to an antenna has occurred, may be provided in association with another operation and by an alternative source in accordance with alternative illustrative systems in accordance with the current disclosure.

During 630, the antenna coverage anomaly detection component 240 applies the current (short term) antenna status (including current values of the subset of features specified by the feature selection component 220) to the centroid rendered by the centroid calculator 230 to render the antenna change detection decision.

During 640, in accordance with detecting an antenna change event during 630, the antenna coverage anomaly detection component 240 issues an antenna change event notification corresponding to the detected antenna change event to the radio access interface change facilities 255.

During 650, in accordance with an actual carrying out of a maintenance operation by a radio access interface change facilities 255, a result of the maintenance operation is stored in the knowledge base 260.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein known to the inventors for carrying out the invention. Variations of these embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for maintaining a physical configuration of an antenna operating within radio access network (RAN) of a mobile wireless network, the method comprising:
    specifying a feature subset of a covering set of features for the antenna;
    generating, by a centroid calculator, a centroid for the antenna, wherein the centroid comprises a current long-term values of the feature subset obtained by processing multiple data sets for the feature subset over a relatively long time period;
    rendering an antenna change detection decision, wherein the rendering an antenna change detection decision comprises:
        first applying, by an antenna coverage anomaly detection component, a current short-term values of the feature subset, which are representative of a current status of the antenna, to the centroid to render a current distance from centroid; and
    issuing, by the antenna anomaly detection component in accordance with detecting an antenna change event during the applying, an antenna change event notification corresponding to the detected antenna change event.

2. The method of claim 1 further comprising:
    filtering data sets for an identified antenna at a grid element granularity,
    wherein filtering is based upon a quantity of data sets generated for the identified antenna:
        at a location falling within a geographical area of a grid element of interest, and
        during a time period of interest.

3. The method of claim 2 wherein the filtering comprises a quantity-based threshold filtering where data sets of the identified antenna are disregarded for a particular grid element if a quantity of data sets do not meet a threshold data set quantity for a specified time period.

4. The method claim 2 wherein the filtering comprises a highest quantity-based filtering where data sets of the identified antenna are disregarded for a particular grid element if a quantity of data sets are not a highest quantity for all antennas having data sets within the particular grid element for a specified time period.

5. The method of claim 1 further comprising:
    storing, by a knowledge base in accordance with an actual carrying out of a maintenance operation, a result of the maintenance operation.

6. The method of claim 1, wherein the feature subset comprises at least two features.

7. The method of claim 6, wherein the at least two features comprise an average distance feature and an azimuth data feature.

8. The method of claim 6, wherein the feature subset comprises two or more features taken from the group consisting of: OSI Layer 2 parameters and Layer 3 parameters.

9. The method of claim 1 wherein the rendering an antenna change detection decision further comprises:
    second applying, by the antenna coverage anomaly detection component, a centroid distance threshold to the current distance from centroid to render an initial antenna detection event decision.

10. The method of claim 9 wherein the rendering an antenna change detection decision further comprises:
    third applying, by the antenna coverage anomaly detection component, a historical feedback information to render a historically confirmed antenna detection event decision.

11. The method of claim 10 wherein the historical feedback information is obtained across multiple distinct antenna installations.

12. A networked system including:
    a network communications interface;
    a processor; and
    a non-transitory computer readable medium including computer-executable instructions that, when executed by the processor, facilitate carrying out a method for maintaining a physical configuration of an antenna operating within radio access network (RAN) of a mobile wireless network, the method comprising:
specifying a feature subset of a covering set of features for the antenna;
generating, by a centroid calculator, a centroid for the antenna, wherein the centroid comprises a current long-term values of the feature subset obtained by processing multiple data sets for the feature subset over a relatively long time period;
rendering an antenna change detection decision, wherein the rendering an antenna change detection decision comprises:
first applying, by an antenna coverage anomaly detection component, a current short-term values of the feature subset, which are representative of a current status of the antenna, to the centroid to render a current distance from centroid; and
issuing, by the antenna anomaly detection component in accordance with detecting an antenna change event during the applying, an antenna change event notification corresponding to the detected antenna change event.

13. The system of claim 12, wherein the method further comprises:
filtering data sets for an identified antenna at a grid element granularity,
wherein filtering is based upon a quantity of data sets generated for the identified antenna:
at a location falling within a geographical area of a grid element of interest, and
during a time period of interest.

14. The system of claim 13 wherein the filtering comprises a quantity-based threshold filtering where data sets of the identified antenna are disregarded for a particular grid element if a quantity of data sets do not meet a threshold data set quantity for a specified time period.

15. The system of claim 13 wherein the filtering comprises a highest quantity-based filtering where data sets of the identified antenna are disregarded for a particular grid element if a quantity of data sets are not a highest quantity for all antennas having data sets within the particular grid element for a specified time period.

16. The system of claim 12 further wherein the method further comprises:
storing, by a knowledge base in accordance with an actual carrying out of a maintenance operation, a result of the maintenance operation.

17. The system of claim 12, wherein the feature subset comprises at least two features.

18. The system of claim 17, wherein the at least two features comprise an average distance feature and an azimuth data feature.

19. The system of claim 17, wherein the feature subset comprises two or more features taken from the group consisting of: OSI Layer 2 parameters and Layer 3 parameters.

20. The system of claim 12 wherein the rendering an antenna change detection decision further comprises:
second applying, by the antenna coverage anomaly detection component, a centroid distance threshold to the current distance from centroid to render an initial antenna detection event decision.

21. The system of claim 20 wherein the rendering an antenna change detection decision further comprises:
third applying, by the antenna coverage anomaly detection component, a historical feedback information to render a historically confirmed antenna detection event decision.

22. The system of claim 21 wherein the historical feedback information is obtained across multiple distinct antenna installations.

* * * * *